May 15, 1956  S. A. LEKSGARD  2,745,176
BARK PEELING DEVICE
Filed Oct. 1, 1953
FIG. 1.  FIG. 2
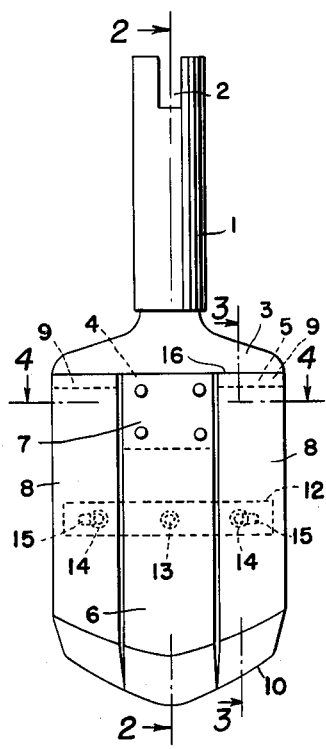
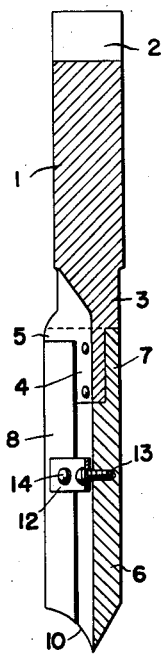
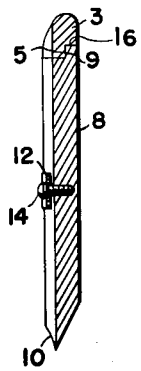
FIG. 3.
FIG. 4.
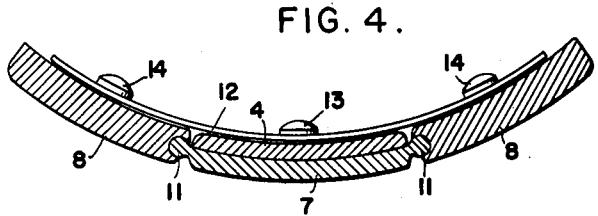
INVENTOR.
SVERRE ALEKSANDER LEKSGARD
BY
*Robert H. Jacob.*
AGENT

United States Patent Office 2,745,176
Patented May 15, 1956

2,745,176

BARK PEELING DEVICE

Sverre Aleksander Leksgard, Oslo, Norway

Application October 1, 1953, Serial No. 383,622

Claims priority, application Sweden April 30, 1953

1 Claim. (Cl. 30—121)

This invention relates to a bark peeling device having the shape of a spade, the free front edge of which may be curved and sharpened and the opposite edge of which is fixed to, or in one piece with a shaft.

Bark peeling devices of this type are often used for manual bark peeling, but hitherto peeling devices of this shape have not been arranged as an attachment for a driving means, such as a pneumatic or the like motor. The drawback of peeling devices of spade shape is that the cut is rather small, especially when the bark of logs of small diameter is to be peeled off.

The object of the present invention is to provide a bark peeling device of the spade shape (in the following termed "bark peeling spade") which is automatically adjusted to fit the most log diameters and which has greater strength than previous tools of the same general type.

The bark peeling spade according to the invention has a blade constituted by a number of lamellas arranged in the longitudinal direction of the spade, of which lamellas one is rigidly connected with the spade shaft and the others are pivotally connected with the first mentioned lamella, said lamellas being spring-loaded so as to tend to partly embrace a log of relatively small diameter.

According to another important feature of the invention the lamellas are hinged together along their long edges which are substantially parallel with one another and with the shaft. A spring may be arranged on one side of the lamellas and transversely to the direction of the shaft. This spring is preferably a curved blade spring rigidly connected with the fixed lamella and slideably connected with the other lamellas.

The bark peeling spade according to the invention may be used for manual barking or may be driven by a motor applying a longitudinal reciprocating movement to the bark peeling spade.

The invention will be better understood when reading the following description with reference to the enclosed drawing in which Fig. 1 shows a bark peeling spade seen against the convex side of the blade, Fig. 2 is a longitudinal section along the line 2—2 in Fig. 1, Fig. 3 is a longitudinal section substantially along the line 3—3 of Fig. 1, and Fig. 4 is an enlarged cross-section along the line 4—4 of Fig. 1.

The shaft of the bark spade according to the invention is numbered 1 and its upper end is provided with a diametrical slot 2 so as to fit to the correspondingly shaped sleeve or the like on the outer end of a piston rod or a similar device applying a reciprocating movement to the bark peeling spade. The lower end of the shaft 1 terminates in a crosshead 3 forming a basis for the spade blade to be described. Said shaft 1 and said crosshead 3 form together an inverse T. In the embodiment shown the crosshead 3 carries three lamellas 6 and 8 of which the middle one 6 is rigidly connected to the head 3, said members being either in one piece or, as in the present case, connected together by a lap joint 4, 7 and rivets or screws as shown. The other lamellas 8 are hingedly connected with the middle lamella 6 along their adjacent edges so that they may turn about axes substantially parallel with the shaft 1 of the spade. The cross section in Fig. 4 shows how said hinged connections 11 have been executed. The middle lamella 6 has along its two long edges tongues of substantially circular cross section, whereas the two outer lamellas 8 are provided with correspondingly shaped grooves so that said lamellas may turn about the tongues at a restricted angle. The upper edges of the lamellas 8 have projections which mate with or rest in notches or recesses 5 in the lower edge of crosshead 3, which notches extend on either side of the lap 4 to the ends of the crosshead. As best shown in Fig. 3, the upper or horizontal surface 16 of the projection on lamella 8 contacts one surface of the notch 5 in crosshead 3 and transmits thrust thereto. The vertical surface 9 of the projection contacts the other surface of notch 5 which is arcuate, and limits inward pivotal movement of the lamella 8 to the contour of the arcuate notch.

The free edges of the lamellas 6 and 8 opposite to the head 3 are curved as shown to take the form of a spade blade, and are also sharpened as indicated by 10.

The lamellas 8 are retained in the position shown by a blade or strip spring 12 which is curved and arranged transversely to the lamellas either on the concave or the convex side of the spade blade. In the present embodiment said blade spring 12 is placed on the concave side of the spade. Intermediate its ends the blade spring has three holes, the middle one being circular to fit a screw or bolt 13 threaded or driven into a hole in the middle lamella 6, whereas the two outer holes 15 are slotted and engaged by bolts or screws 14 driven or threaded into the outer lamellas 8. The spring 12 will press the lamellas 8 against the notches or recesses 5 of the head 3, in which position of the lamellas the spade will fit a log of relatively small diameter. It may be noted that the upper edges of the lamellas 8 are supported by the mating surfaces of the notches 5 so that thrust loads are supported by the crosshead 3, thus relieving the hinges 11 of this load.

When the bark peeling spade is to be used for barking a log, it is placed in the usual way forming an acute angle with the log and is fed along same. Simultaneously a certain pressure is applied to the spade or its head which pressure must be able to overcome the action of the spring 12. If the log has a diameter which is greater than corresponding to the curvature of the spade in its resting position, the outer lamellas 8 will be turned about their respective hinges 11 and swung outwardly so as to fit snugly the log, thus enabling the spade to peel off bark strips of a greater width than would else be possible.

Obviously the invention may be varied in many ways. For instance same is not limited to the use of three lamellas, it being also possible to use a greater odd number, such as five or seven with the middle lamella rigidly connected to the shaft head. The different lamellas may also have different width.

Lamellas which are worn out may easily be replaced by new lamellas by removing the bolts or screws 13 or 14, whereupon the old lamella or lamellas may be pulled out and a new one pushed in along the tongue 11. Also the middle lamella 6 may easily be replaced by a new one by loosening the lap joint 4, 7.

In the embodiment shown in the drawing and described above the shaft of the bark peeling spade is formed so as to co-operate with a reciprocating part of a driving means, such as is used for instance in pneumatic tools. However, it is obvious that the bark peeling spade according to the invention may also be manually operated, in which case the shaft forms a grip to be held by the worker's two hands, one of which moves the spade forth and back along the log while the other urges the spade blade against the log to overcome the action of the spring 12 and keep the sharpened edge 10 in contact with the wood proper so as to peel off the bark in broad and long strips.

I claim:

A spade-shaped bark peeling tool comprising a shaft portion adapted for connection to an actuating means, an arcuate crosshead integral with said shaft and extending arcuately outward from said shaft, the central portion of said crosshead having an integral depending flange of less thickness than the crosshead, a central lamella having a cut out portion adjacent its upper end, said cut out portion mating with the aforesaid depending flange to form a lap joint therewith, means detachably securing said central lamella rigidly to the aforesaid depending flange, a pair of notches formed integrally in said crosshead along one of the lower edges thereof and extending from either side of the depending flange to the ends of the crosshead, a pair of side lamellas hingedly secured to said central lamella for pivotal movement along their adjacent sides, the upper ends of said side lamellas having projections mating with the notches in the crosshead whereby upward thrust on said side lamellas is transmitted to said crosshead through engagement of the tops of the projections on said side lamella with one surface of the aforesaid notches and the other surface of the notches may engage the side surfaces of the aforesaid projections to limit pivotal movement of the side lamellas to the aforesaid arcuate contour of the crosshead, the lower edges of said central and side lamellas being sharpened and having an arcuate edge contour along an arc in a plane parallel to the axis of the tool.

References Cited in the file of this patent

UNITED STATES PATENTS

| 1,558,735 | McArthur | Oct. 27, 1925 |

FOREIGN PATENTS

| 36,419 | Germany | Aug. 25, 1886 |
| 822,611 | Germany | Nov. 26, 1951 |